(12) United States Patent
Treadwell et al.

(10) Patent No.: US 8,037,536 B2
(45) Date of Patent: Oct. 11, 2011

(54) RISK SCORING SYSTEM FOR THE PREVENTION OF MALWARE

(75) Inventors: William Scott Treadwell, Warrenton, VA (US); Mian Zhou, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 981 days.

(21) Appl. No.: 11/940,062

(22) Filed: Nov. 14, 2007

(65) Prior Publication Data

US 2009/0126012 A1    May 14, 2009

(51) Int. Cl.
| G06F 11/00 | (2006.01) |
| G06F 12/14 | (2006.01) |
| G06F 12/16 | (2006.01) |
| G08B 23/00 | (2006.01) |
| G06F 15/173 | (2006.01) |

(52) U.S. Cl. ............................................ 726/25; 726/23
(58) Field of Classification Search .................... 726/25
See application file for complete search history.

(56) References Cited

U.S. PATENT DOCUMENTS

| 5,572,590 | A | * | 11/1996 | Chess | 726/22 |
| 6,205,552 | B1 | * | 3/2001 | Fudge | 726/25 |
| 7,331,062 | B2 | * | 2/2008 | Alagna et al. | 726/23 |
| 7,487,544 | B2 | * | 2/2009 | Schultz et al. | 726/24 |
| 7,712,136 | B2 | * | 5/2010 | Sprosts et al. | 726/24 |
| 7,748,039 | B2 | * | 6/2010 | Obrecht et al. | 726/25 |
| 2002/0066024 | A1 | | 5/2002 | Schmall et al. | |
| 2004/0230835 | A1 | | 11/2004 | Goldfeder et al. | |
| 2006/0212931 | A1 | * | 9/2006 | Shull et al. | 726/10 |
| 2006/0259967 | A1 | * | 11/2006 | Thomas et al. | 726/22 |
| 2007/0055711 | A1 | | 3/2007 | Polyakov et al. | |
| 2007/0079379 | A1 | * | 4/2007 | Sprosts et al. | 726/24 |
| 2007/0143851 | A1 | * | 6/2007 | Nicodemus et al. | 726/25 |
| 2007/0226797 | A1 | * | 9/2007 | Thompson et al. | 726/22 |
| 2008/0295177 | A1 | * | 11/2008 | Dettinger et al. | 726/24 |
| 2010/0095379 | A1 | * | 4/2010 | Obrecht et al. | 726/23 |

FOREIGN PATENT DOCUMENTS

WO    2007/117567 A    10/2007

OTHER PUBLICATIONS

International Search Report issued on Sep. 1, 2008 in corresponding PCT Application No. PCT/US2008/056628.

* cited by examiner

*Primary Examiner* — Nathan Flynn
*Assistant Examiner* — Carolyn B Kosowski
(74) *Attorney, Agent, or Firm* — Banner & Witcoff, Ltd.; Michael A. Springs

(57) ABSTRACT

A method suitable for detecting malicious files includes several steps. A file that is received into a computer system is analyzed to determine a presence or absence of each of a plurality of predefined properties in the file. A score is calculated based on the presence or absence of the plurality of properties in the file. This score is reflective of the risk that the file is malicious. Once the score is calculated, the file can be further processed based on the score.

13 Claims, 5 Drawing Sheets

RISK SCORING SYSTEM FOR THE PREVENTION OF MALWARE

TECHNICAL FIELD

The invention relates to a system and method for analyzing software programs, and more specifically, to a system and method for determining whether a file is likely to be malicious or non-malicious.

BACKGROUND

In the increasingly interconnected computer environment, there is an ever-increasing number of viruses and other malicious software, or "malware," that attack the components and framework of the interconnectivity. One limitation of malicious files is that they must be loaded into memory in order to execute, and must be executed in order to perform their malicious functions. However, many prior systems, methods, and software to fight these malicious files cannot or do not recognize the files as malicious until the files are already loaded into memory. Additionally, many prior software products require continuous updates in order to recognize the most recently developed malicious software. These and other prior systems and methods have certain drawbacks and disadvantages.

BRIEF SUMMARY

The present system and method are provided to solve the problems discussed above and other problems, and to provide advantages and aspects not provided by prior systems and methods of this type.

Aspects of the present invention relate to a method suitable for detecting malicious files that includes several steps. A file that is received into a computer system is analyzed to determine a presence or absence of each of a plurality of predefined properties in the file. A score is calculated based on the presence or absence of the plurality of properties in the file. This score is reflective of the risk that the file is malicious. Once the score is calculated, the file can be further processed based on the score.

According to one aspect, the properties analyzed include whether a section name of the file is flagged, whether a section characteristic of the file is non-standard, whether an entry point of the file is in a code section of the file, whether an import function count of the file is low, whether an import function table for the file contains a zero ordinal value, whether a thread local storage section of the file has a defined function, and whether the file has a library export count of zero.

According to another aspect, the calculation of the score includes several steps. A risk score and a weight score are generated for each property analyzed for the file. The risk score is reflective of the probability of the respective property existing in a malicious file, and is recorded if the analyzed property is present in the file. The weight score is reflective of the probability of the respective property existing in a malicious file, and is recorded if the analyzed property is either present or absent in the file. The overall score is then calculated based on an aggregate of the risk scores and the weight scores.

According to a further aspect, the invention may include a computer-readable medium containing computer-executable code comprising instructions configured to cause one or more processors to perform a method as described above.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

To understand the present invention, it will now be described by way of example, with reference to the accompanying drawings in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
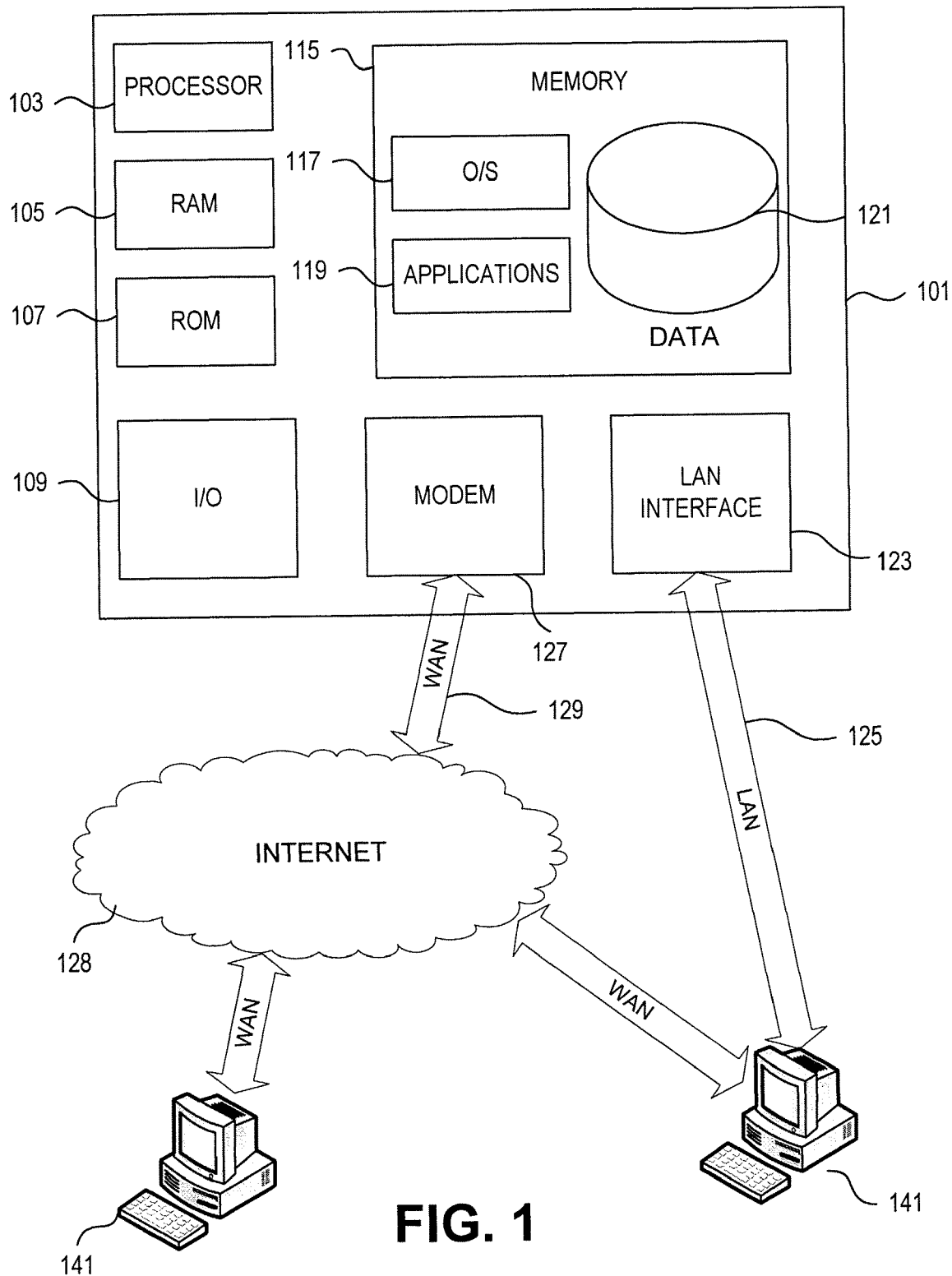
FIG. 1 is a schematic diagram of one embodiment of a computer system.

FIG. 1 illustrates a block diagram of a computer system 101 that may be used according to an illustrative embodiment of the invention. The computer 101 may have a processor 103 for controlling overall operation of the computer 101 and its associated components, including RAM 105, ROM 107, input/output module 109, and memory 115. I/O 109 may include a user input device through which a user of computer 101 may provide input, such as a microphone, keypad, touch screen, mouse, and/or stylus, and may also include one or more of a speaker for providing audio output and a video display device for providing textual, audiovisual and/or graphical output.

Software may be stored within memory 115 and/or storage to provide instructions to processor 103 for enabling the computer 101 to perform various functions, including functions relating to the methods described herein. For example, memory 115 may store software used by the computer 101, such as an operating system 117, application programs 119, and an associated database 121. Alternatively, some or all of the computer executable instructions may be embodied in hardware or firmware (not shown). As described in detail below, the database 121 may provide centralized storage of account information and account holder information for a business, allowing interoperability between different elements of the business residing at different physical locations. It is understood that a computer system 101, single processor 103, and single memory 115 are shown and described for sake of simplicity, and that the computer system 101, processor 103, and memory 115 may include a plurality of computer systems, processors, and memories respectively.

The computer 101 may be configured to operate in a networked environment supporting connections to one or more other computers, such as terminals 141. The terminals 141 may be personal computers or servers that include many or all of the elements described above relative to the computer 101. The network connections depicted in FIG. 1 include a wide area network (WAN) 129, but may also include other networks, such as a local area network (LAN) 125. When used in a LAN networking environment, the computer 101 is connected to the LAN 125 through a network interface or adapter 123. When used in a WAN networking environment, the computer 101 may include a modem 127 or other means for establishing communications over the WAN 129, such as the Internet 128. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Figure 2:
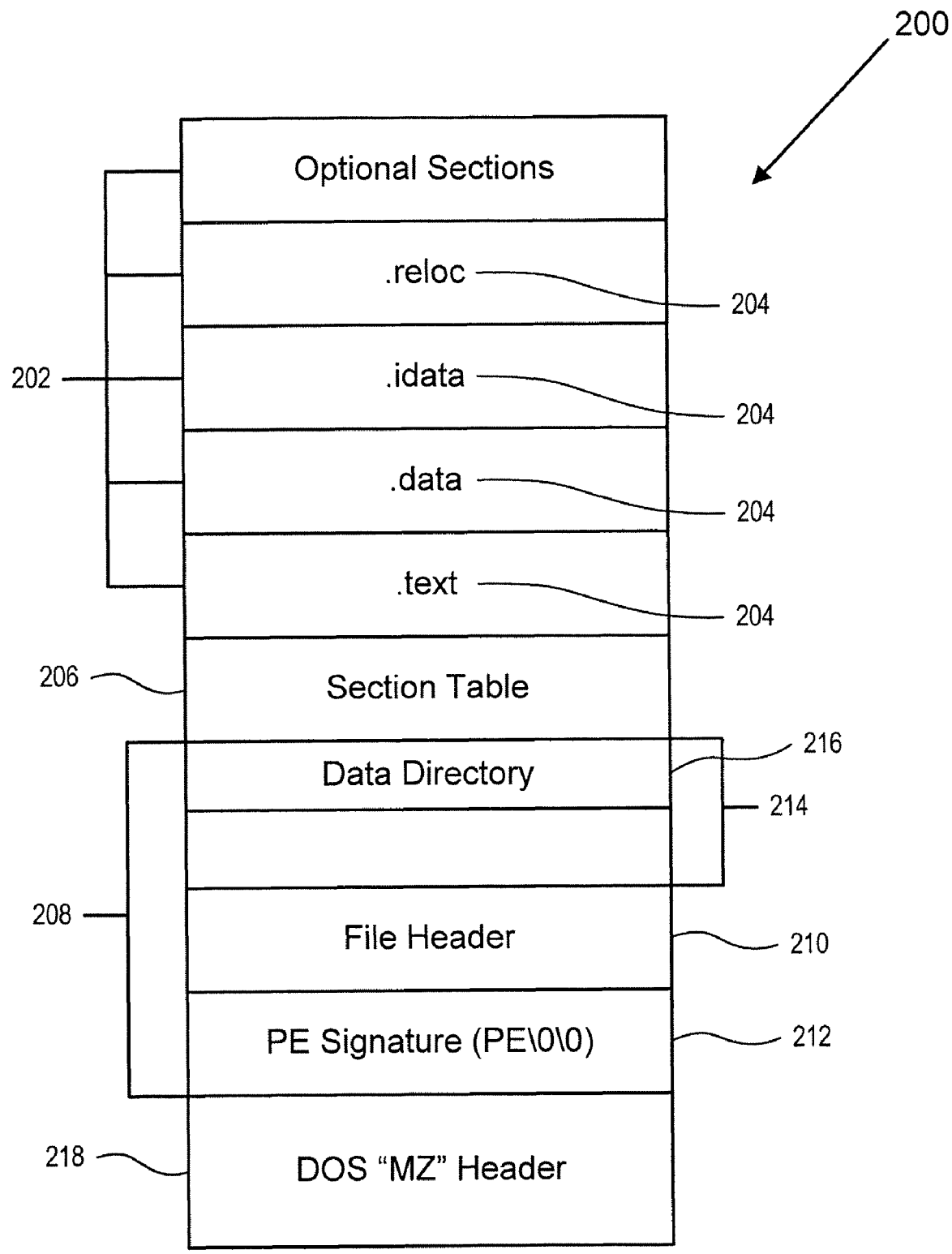
FIG. 2 is a schematic diagram of one embodiment of a portable executable file.

FIG. 2 illustrates one example of a binary portable executable (PE) file 200, such as EXE, DLL, OCX, OBJ, SYS, SCR, or other PE file types. The PE file 200 contains several sections 202 having different section names 204 and a section table 206 containing an array of section headers. The PE file 200 also contains a DOS "MZ" header 218 and a NT header 208 that includes a file header 210, a PE Signature 212, and an optional header 214 that includes a data directory 216. It is understood that different files may be set up or designed differently than the file 200 shown in FIG. 2, such as other PE or non-PE files. For example, different coders and/or compilers often have standard file formats for their files, which may typically contain specified section types and section names.

Figure 3:
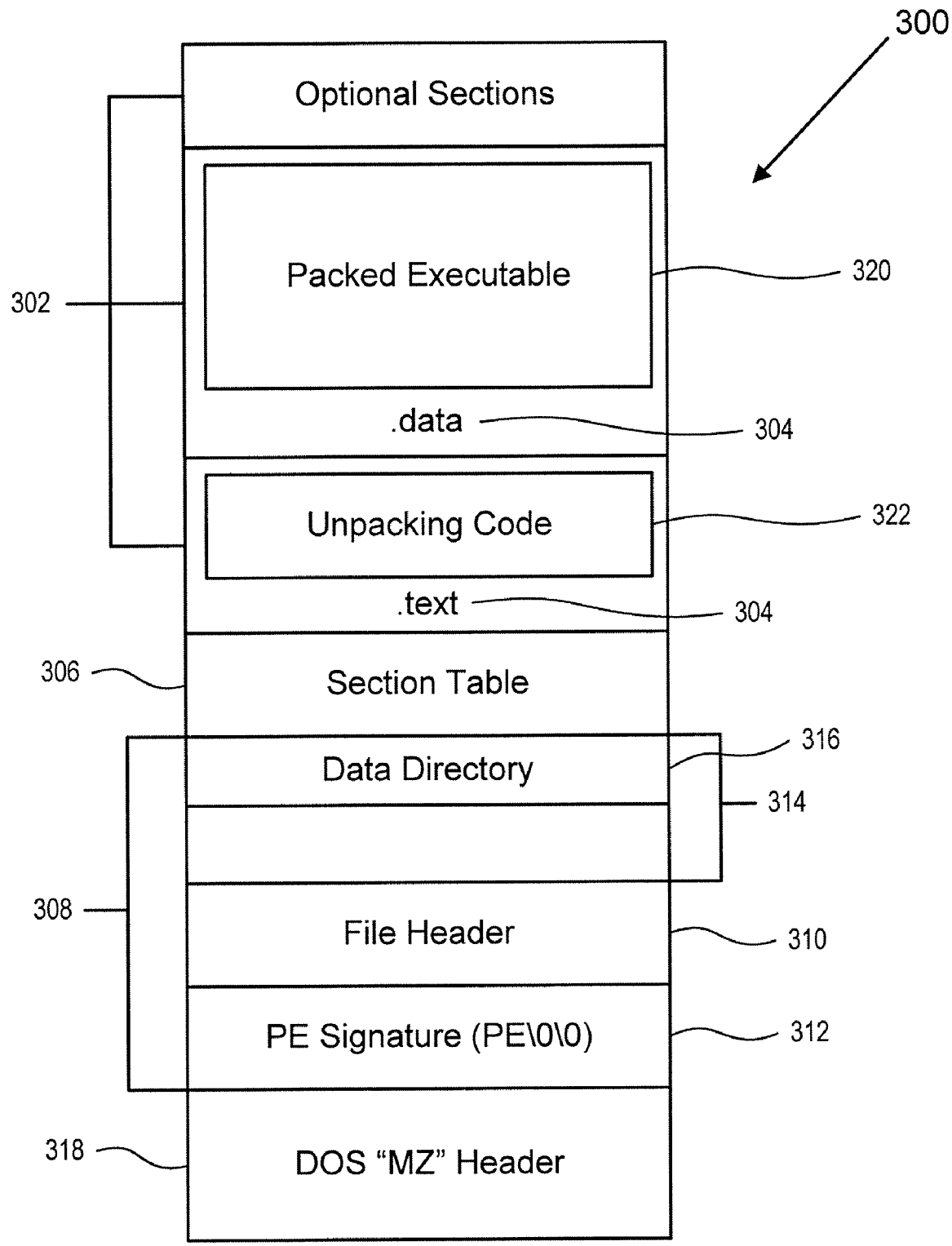
FIG. 3 is a schematic diagram of one embodiment of a packed portable executable file.

FIG. 3 illustrates one example of a packed binary PE file 300, which is a normal PE file structured similarly to the PE file 200 shown in FIG. 2, containing a packed executable 320 therein. For example, the packed file 300 contains several sections 302, each having a section name 304, and a section table 306 containing an array of section headers. Like the PE file 200, the packed file 300 also contains a DOS "MZ" header 318 and a NT header 308 that includes a file header 310, a PE Signature 312, and an optional header 314 that includes a data directory 316. The packed executable 320 may be an existing application that is encrypted and wrapped with a packing utility, as is known in the art. An unpacking code 322 works to deobfuscate the packed executable 320 in memory and then transfers execution to the unpacked executable. The packed executable 320 is contained within the packed file 300, as well as the unpacking code 322 for unpacking the packed executable 320. Packing a file, possibly along with encryption, is one way that malware typically hides its true intent or purpose. However, packing itself cannot be considered a sign of maliciousness in a file, as many non-malicious files are packed.

Figure 4:
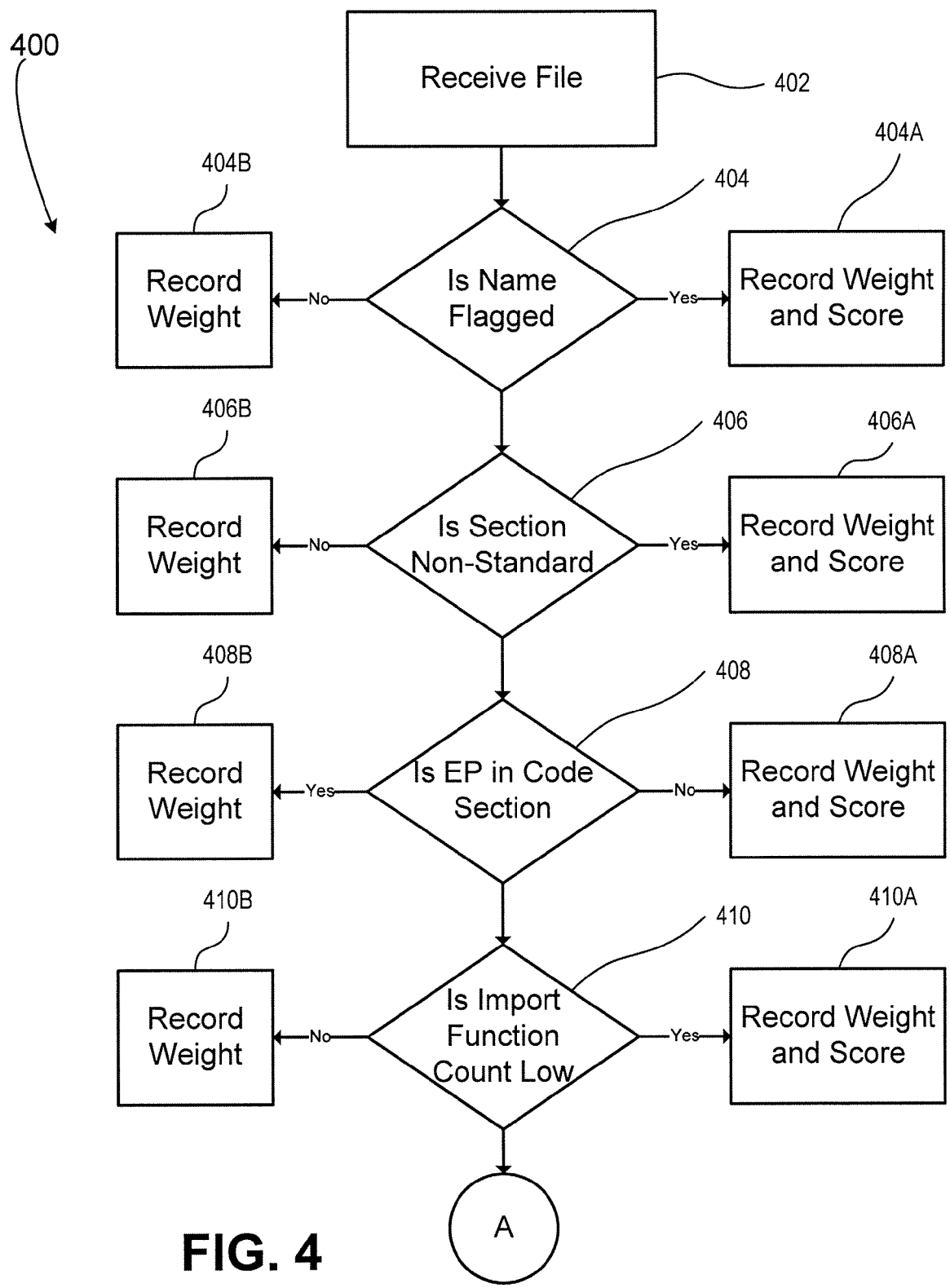
FIG. 4 is a process flow diagram of one embodiment of a method for detecting malicious files.
Figure 5:
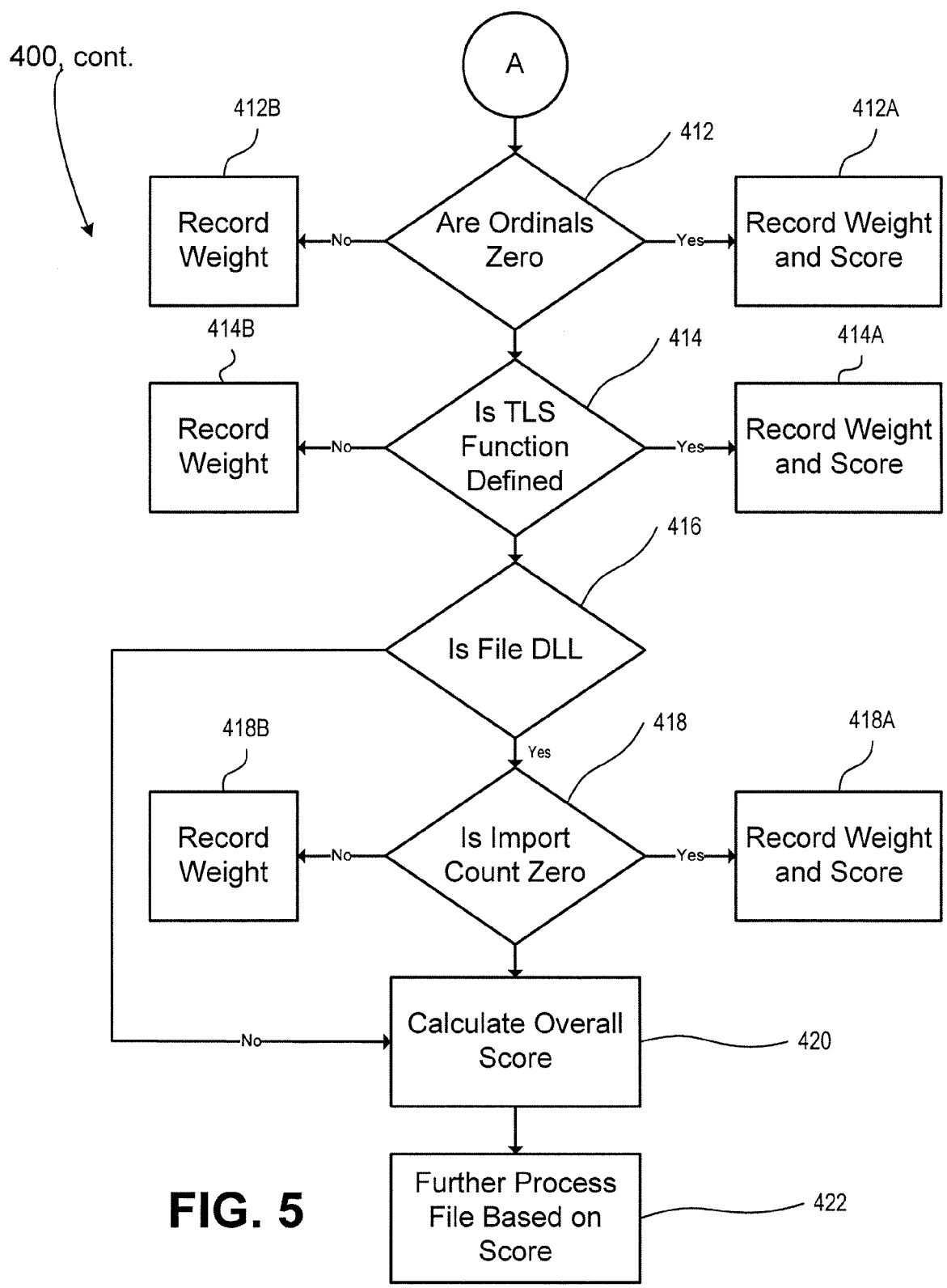
FIG. 5 is a continuance of the process flow diagram of FIG. 4.

FIGS. 4-5 illustrate one exemplary embodiment of a method 400 for identifying malicious files. At step 402, a file to be analyzed is received into a computer system. The computer 101 shown in FIG. 1 is an example of such a computer system. However, it is understood that the method may be used with a much larger and more complex computer system, for example, a system that contains many computers 101 as described above. The file may be received from one of many sources, including as an attachment to an email or other communication, an Internet download, a file embedded within another file, a file located on a computer storage medium that is read by the computer, and any other known source. In one embodiment, the file is a binary PE file, such as shown above in FIG. 2, and may also be packed, as shown above in FIG. 3. The file is then analyzed, at steps 404-418, to determine the presence or absence of several properties.

Most malicious software is either packed or encrypted, or both, to attempt to prevent reverse engineering and to delay or evade detection by anti-virus software. The methods used by packers and cryptors of malicious files also create certain properties and characteristics of the files that are different from the properties of normal software. In one embodiment, the properties to be analyzed are predefined, and are defined as properties that may be associated with malicious files. Accordingly, in this embodiment, the analysis performed at steps 404-418, as described below, permit statistical evaluation of the file to determine the likelihood of the file being malicious. Additionally, in one embodiment, at least some of the properties analyzed are properties of the coding of the file. In the embodiment of the method 400 described herein, some of the properties analyzed are properties of the sections or section names of the file, and some of the properties analyzed are library properties of the file.

In the embodiment shown in FIGS. 4-5, each property has scores associated therewith, which are used in determining whether the file is likely to be malicious. In one embodiment, a risk score and a weight score is associated with each property and are generated in connection with the method. The risk score is related to the probability or incidence of occurrence of the property in a malicious file. In other words, the risk score is based on how frequently the specified property is expected to occur in malicious files. The weight score is inversely related to the probability or incidence of occurrence of the property in a non-malicious file, or in other words, how frequently the specified property typically occurs in non-malicious files. Viewed another way, the weight score also directly reflects the strength of indication of maliciousness from the presence of the specified property itself, when considered alone, i.e. the severity of the occurrence with respect to the property being indicative of maliciousness. For example, a property that is nearly always present in malicious files and is only occasionally present in non-malicious files will have a high risk value and a low weight value. In another example, a property that occurs sometimes in malicious files but never occurs in non-malicious files will have an intermediate risk value but a high weight value. In one embodiment, the risk and weight scores assigned to each property are predetermined values based on the above-described considerations. Accordingly, in one embodiment, the predetermined risk scores may be "10" to indicate high risk, "5" to indicate intermediate risk, and "1" to indicate low risk, and a risk rating of "0" is given if the property being analyzed is found not to occur in the file. Similarly, in one embodiment, each property may have a weight value of 100, 50, 25, 12, 6, or 3, listed from high weight to low weight. The scores associated with the examined properties may be subjectively or objectively determined by a designer, and other scoring formats may be used in other embodiments.

At steps 404-408, the characteristics of the sections of the file are analyzed. At step 404, the each section name is analyzed to determine whether the section name has been flagged as a section name that may potentially occur in a malicious file. A list of such flagged names may be used in conjunction with this analysis. The presence of one or more flagged names may be an indicator that the file is malicious, and in that case, the risk and weight scores are recorded, at step 404A. If no flagged names are found, the weight score is recorded, and the risk score is assigned to be "0", at step 404B. In another embodiment, for example, the risk and weight values may change depending on the number of flagged names found in the file.

At step 406, the characteristics of each section are analyzed to determine whether the section is non-standard. As described above, many legitimate coders and/or compilers have standard section names that occur in their files, as well as standards for other characteristics of a section having a specific section name, including, for example, what type of information is typically included in the specific section and a typical size of the section. For example, the code section of a file may have the section name ".text" or ".code" in some standard configurations. Both the section name and the other characteristics of the section are evaluated to determine whether they are non-standard at step 406. In one embodiment, lists of standards created and/or published by known trustworthy coders and/or compilers can be used to establish the standards used in this determination. Some malware uses non-standard section names to assist the unpacking code in recognizing the pieces to unpack. Additionally, some malware uses standard section names, but the sections may have contents and/or characteristics that are different from the established standards. Accordingly, the presence of one or more non-standard sections may be an indicator that the file is malicious, and in that case, the risk and weight scores are recorded, at step 406A. If no non-standard sections are found, the weight score is recorded, and the risk score is assigned to be "0", at step 406B. In another embodiment, for example, the risk and weight values may change depending on the number of non-standard sections found in the file.

At step 408, the file is analyzed to determine whether the entry point resides outside the code section of the file. As known in the art, the entry point refers to the address where the code to execute begins in the file, i.e., where the file passes execution to the application. Typically, in non-malicious files, the address of the entry point resides in the code section. However, in malicious files, the entry point can sometimes reside outside the code section, allowing the contents and intent of the file to be masked. Accordingly, if the entry point resides outside the code section of the file, it may be an indicator that the file is malicious, and in that case, the risk and weight scores are recorded, at step 408A. If the entry point resides in the code section, the weight score is recorded, and the risk score is assigned to be "0", at step 408B.

At steps 410 and 412, the library properties of the file are analyzed. As known in the art, many files, including PE files, typically import or utilize one or more functions supplied by other files and applications (such as a DLL file), and the corresponding functions are referred to as library functions. At step 410, the file is analyzed to determine whether the number of library functions imported, also known as the "import count" of the file, is low. Even relatively simple non-malicious files usually require a large number of imported library functions to execute. However, many malicious files have an import count that is zero or otherwise very low, for one or more reasons. For example, the file may hide or obscure the functions needed by the program, or necessary functions may be packed within the file itself. A threshold may be established in performing step 410, and if the import count is below the threshold, that property may be an indicator that the file may be malicious. In that case, the risk and weight scores are recorded, at step 410A. In one embodiment, the threshold for the number of library functions imported is established as 4 or 5. If the import count is above the threshold, the weight score is recorded, and the risk score is assigned to be "0", at step 410B. In another embodiment, for example, several threshold values for import counts may be established, and different risk and weight values may be assigned to import counts falling within certain threshold ranges.

At step 412, the import function table is analyzed to determine whether the table contains an ordinal value that is zero (e.g. "0000" in one embodiment). Ordinal values are values that are used to find import functions from a DLL, as well as to find the proper function in memory and to resolve that address to the address table of the application in the case of delayed loading. An ordinal value of zero rarely occurs in a legitimate program for delayed loading, as the zero value indicates that the imported library function does not exist. However, malicious programs often can resolve addresses of functions as the program executes, making the import function table unnecessary. As a result, packers and encryptors of such files often do not properly align and reconstruct the import table, leaving a messy and mangled table that has one or more zero ordinal values. Accordingly, if the import function table of the file has a zero ordinal value for its delayed loading API, that property may be an indicator that the file is malicious. In that case, the risk and weight scores are recorded, at step 412A. If no zero ordinal values are discovered, the weight score is recorded, and the risk score is assigned to be "0", at step 412B. In another embodiment, for example, additional properties of the import function table may be analyzed.

At step 414, if the file has a Thread Local Storage (TLS) section, the file is analyzed to determine whether the TLS section has a function defined therein. While many files do not use a TLS section, the TLS section provides the ability to execute functions for initialization, prior to execution of the program itself. Some malicious files may use a function in a TLS section to detect debugging software or perform other functions prior to starting the program. Accordingly, if the file has a TLS section with a function defined therein, that property may be an indicator that the file is malicious, and in that case, the risk and weight scores are recorded, at step 414A. If no function is defined in a TLS section, the weight score is recorded, and the risk score is assigned to be "0", at step 414B.

If the file is a Dynamic Link Library (DLL) file, an additional check may be performed. At step 416, the method checks whether the file is a DLL file, and if so, the file is analyzed to determine whether the number of functions exported is zero, at step 418. DLL files typically contain a library of functions that can be exported to other applications for use, as described above. As a result, a legitimate DLL would be expected to export at least one function. However, some malware developers create a DLL file with no exported functions, which are then executed in a similar fashion to an EXE file, such as by using the rundll32.exe application. Accordingly, if the file is a DLL file that exports no functions, that property may be an indicator that the file is malicious, and in that case, the risk and weight scores are recorded, at step 418A. If the DLL file exports one or more functions, the weight score is recorded, and the risk score is assigned to be "0", at step 418B. If the file is not a DLL file, as determined at step 416, then step 418 is skipped.

It is understood that other properties and characteristics of the file may be examined in accordance with the method described herein, and that in some embodiments, one or more of the properties described herein may not be examined. It is also understood that, in some embodiments, the above-described properties may be examined in a different manner and scored in different ways. Certain examples of such embodiments are discussed above, and many other examples exist.

Once all of the predetermined properties have been analyzed, at steps 404-418, an overall score is calculated using the risk and weight scores, at step 420, which score is reflective of the overall risk that the file is malicious, based on all of the properties examined. The score may be a numerical score, a letter rating or grade, a verbal rating, or any other indicator of the risk of the file being malicious. In one embodiment, the score is a statistical numerical score, and an algorithm may be used to calculate the score, such as by aggregating the risk and weight scores recorded for each property. One exemplary embodiment uses the algorithm:

$$\frac{\sum_i (W_i * X_i)}{\sum (W_i)}$$

in calculating the score, where $W_i$ is the weight score and $(W_i*X_i)$ is the product of the weight score and the risk score for each property i. As described above, the risk score for some of the properties may be "0", such as when the property is found not to exist in the file. In that case, the weight score will still factor into the overall score, but the $(W_i*X_i)$ will be zero, so that only the denominator of the equation is affected. Thus, the overall score determined using the algorithm described above will be directly related to the risk that the file is malicious. It is understood that other algorithms, or other non-mathematical methods, may be used to calculate the overall score for the file.

After the overall score has been calculated, the file is further processed based on the overall score, at step 422. The further actions taken to process the file could be done electronically, manually, or both, in various embodiments. For example, in one embodiment, a notification is transmitted to one or more relevant persons, entities, or computers, if the score exceeds a certain threshold. In this embodiment, the recipient of the notification may investigate the file more closely or take further action with regard to the file. In another embodiment, the file may be quarantined, deleted, or other such action taken to prevent the file from being loaded into memory and/or executed. In another embodiment, the file may be subjected to further examination, which may include forensic analysis based on the score. Still other actions may be taken to process the file in other embodiments. It is understood that several thresholds may be set, and that different actions may be taken, depending on where the overall score falls with regard to the thresholds. For example, in one embodiment, if a file that is determined to have a medium overall risk level, a notification is sent to a user, requesting the user to choose how to proceed.

Generally, a malicious file will not be able to perform its malicious functions until the file has been loaded into memory and/or execution of the file has begun. Accordingly, in one embodiment, the analysis, scoring, calculation of the overall score, and further processing are all performed before the file is loaded into memory and/or before execution of the file begins.

As stated above, FIGS. 4-5 illustrate an example of one or more aspects of a method for detecting and processing malicious files. The steps of the method described above can be accomplished by means and/or components contained within the computer system 101, such as the memory 115, processor 103, and/or program modules and computer-executable instructions stored therein or executed thereby, and may also be accomplished by non-computer means, such as by IT personnel or forensic investigators, or by a combination of human and computerized components. Other components of the computer system 101 may also constitute means for accomplishing aspects of the present invention, as understood by those skilled in the art. It is understood that one entity or computer system may not perform each and every aspect of the present invention and that aspects may be outsourced to one or more other entities.

Aspects of the present invention are operational with numerous other general purpose or special purpose computing system environments or configurations, such as the computer system 101 shown in FIG. 1. Examples of well known computing systems, environments, and/or configurations that may be suitable for use with the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As described above, aspects of the present invention may be described in the general context of computer-executable instructions, such as program modules, being executed by a computer. Generally, program modules include routines, programs, objects, components, data structures, etc. that perform particular tasks or implement particular abstract data types. The present invention may also be practiced in distributed computing environments where tasks are performed by remote processing devices that are linked through a communications network. In a distributed computing environment, program modules may be located in the memory 115, which may include both local and remote computer storage media including memory storage devices. It is understood that connections and communications disclosed herein may be made by any type of wired or wireless connection or communication.

Aspects of the present invention provide many benefits not provided by prior systems and methods for malware detection and processing. For example, the invention can detect malicious software before the software is loaded into memory or begins execution, unlike certain existing anti-virus software which may not detect or even analyze malicious programs until it is too late. Additionally, the invention may work properly without periodic updates, in contrast to some anti-virus software, which requires periodic updates in order to detect a new type of malicious program. Certain embodiments of the invention have been found to correctly recognize malicious files at least as effectively as existing anti-virus software. Accordingly, the invention can be used, in one embodiment, as a replacement for existing anti-virus software, or as a complement to existing anti-virus software. Still other benefits and advantages exist and are apparent to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is further understood that the invention may be in other specific forms without departing from the spirit or central characteristics thereof. The present examples therefore are to be considered in all respects as illustrative and not restrictive, and the invention is not to be limited to the details given herein. The term "plurality," as used herein, indicates any number greater than one, either disjunctively or conjunctively, as necessary, up to an infinite number. Accordingly, while the specific examples have been illustrated and described, numerous modifications come to mind without significantly departing from the spirit of the invention and the scope of protection is only limited by the scope of the accompanying claims.

What is claimed is:

1. A method comprising:
   analyzing a file, by a computing device having a processor, to determine a presence or absence of each of a plurality of predefined properties in the file;
   calculating a score, by the computing device, based on the presence or absence of the plurality of properties in the file, the score being reflective of a risk that the file is malicious, wherein calculating the score comprises:
      generating a risk score for each property determined to be present in the file, the risk score reflecting a probability of the respective property existing in a malicious file,
      generating a weight score for each property, the weight score reflecting a probability of occurrence of the respective property in a non-malicious file, wherein the weight score is inversely related to the probability of occurrence of the respective property in a non-malicious file, and
      calculating the score based on an aggregate of the risk scores and the weight scores; and
   further processing the file based on the score, using the computing device.

2. The method of claim 1, wherein the plurality of properties comprises properties selected from the group consisting of: whether a section name of the file is flagged, whether a section of the file is non-standard, whether an entry point of the file is in a code section of the file, whether an import function count of the file is low, whether an import function table for the file contains a zero ordinal value, whether a thread local storage section of the file has a defined function, and whether the file has a library export count of zero.

3. The method of claim 1, wherein the analyzing, calculating, and processing are performed before loading the file into memory.

4. The method of claim 1, wherein further processing the file based on the score comprises generating a notification if the score exceeds a threshold.

5. The method of claim 1, wherein a first of the plurality of properties is a property of a section characteristic of the file and a second of the plurality of properties is a library property of the file.

6. The method of claim 1, wherein calculating the score uses the algorithm:

$$\frac{\sum (W_i * X_i)}{\sum (W_i)}$$

wherein $W_i$ is the weight score and $W_i * X_i$ is the product of the weight score and the risk score, for each property i.

7. The method of claim 1, wherein the file is a portable executable file.

8. A non-transitory computer-readable medium containing computer-executable code comprising instructions configured to cause one or more processors to perform:
   analyzing a file to determine a presence or absence of each of a plurality of predefined properties in the file; and
   calculating a score based on the presence or absence of the plurality of properties in the file, the score being reflective of a risk that the file is malicious, wherein calculating the score comprises:
      generating a risk score for each property determined to be present in the file, the risk score being reflective of a probability of the respective property existing in a malicious file,
      generating a weight score for each property, the weight score reflecting a probability of occurrence of the respective property in a non-malicious file, wherein the weight score is inversely related to the probability of occurrence of the respective property in a non-malicious file, and
      calculating the score based on an aggregate of the risk scores and the weight scores.

9. The computer-readable medium of claim 8, wherein the plurality of properties comprises properties selected from the group consisting of: whether a section name of the file is flagged, whether a section characteristic of the file is non-standard, whether an entry point of the file is in a code section of the file, whether an import function count of the file is low, whether an import function table for the file contains a zero ordinal value, whether a thread local storage section of the file has a defined function, and whether the file has a library export count of zero.

10. The computer-readable medium of claim 8, further comprising generating a notification if the score exceeds a threshold.

11. The computer-readable medium of claim 8, wherein a first of the plurality of properties is a property of a section characteristic of the file and a second of the plurality of properties is a library property of the file.

12. The computer-readable medium of claim 8, wherein calculating the score uses the algorithm:

$$\frac{\sum (W_i * X_i)}{\sum (W_i)}$$

wherein $W_i$ is the weight score and $W_i * X_i$ is the product of the weight score and the risk score, for each property i.

13. The computer-readable medium of claim 8, wherein the file is a portable executable file.

* * * * *